(12) United States Patent
Ryu

(10) Patent No.: US 8,596,933 B2
(45) Date of Patent: Dec. 3, 2013

(54) CUTTING TOOL HAVING POCKET BOTTOM WITH BASE AND INCLINED SURFACES

(75) Inventor: Su Jin Ryu, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 266 days.

(21) Appl. No.: 13/132,288

(22) PCT Filed: Dec. 11, 2008

(86) PCT No.: PCT/KR2008/007341
§ 371 (c)(1),
(2), (4) Date: Jun. 1, 2011

(87) PCT Pub. No.: WO2010/067910
PCT Pub. Date: Jun. 17, 2010

(65) Prior Publication Data
US 2011/0236143 A1     Sep. 29, 2011

(51) Int. Cl.
*B23C 5/22* (2006.01)
(52) U.S. Cl.
USPC ............................. 407/42; 407/113; 407/34
(58) Field of Classification Search
CPC ......................................................... B23C 5/22
USPC ......... 407/113, 103, 104, 107, 34, 40, 41, 42, 407/47, 48
See application file for complete search history.

(56) References Cited

U.S. PATENT DOCUMENTS

| | | | |
|---|---|---|---|
| 3,629,919 A * | 12/1971 | Trevarrow, Jr. | ............... 407/103 |
| 5,059,068 A | 10/1991 | Scott | |
| 5,076,738 A | 12/1991 | Pano et al. | |
| 5,542,795 A * | 8/1996 | Mitchell | ......................... 407/35 |
| 5,921,724 A | 7/1999 | Erickson et al. | |
| 5,931,613 A | 8/1999 | Larsson | |

(Continued)

FOREIGN PATENT DOCUMENTS

| | | | | |
|---|---|---|---|---|
| DE | 3810032 A1 * | 10/1988 | ............. | B23B 27/16 |
| DE | 19847227 * | 4/2000 | ............. | B23B 27/16 |

(Continued)

OTHER PUBLICATIONS

International Search Report in PCT/KR2008/007341, dated Jul. 27, 2009.

(Continued)

*Primary Examiner* — Daniel Howell
*Assistant Examiner* — Ryan Rufo
(74) *Attorney, Agent, or Firm* — Womble Carlyle

(57) ABSTRACT

A cutting tool has a main body provided with a pocket part and a cutting insert. The pocket part includes at least one side wall and bottom surface which includes a pocket part base surface, a first pocket part inclined surface connected to an inner end of the base surface on an inside of the main body, and a second pocket part inclined surface connected to an outer end of the base surface on an outside of the main body. The cutting insert has an upper surface, a lower surface and side surfaces connecting the upper surface and the lower surface. The lower surface includes an insert base surface, first and second inclined surfaces inclined upwardly from first and second sides of the base surface, respectively. The cutting insert is seated in the pocket part such that the second inclined surface abuts the second pocket part inclined surface.

17 Claims, 10 Drawing Sheets

(56) References Cited

U.S. PATENT DOCUMENTS

| | | | |
|---|---|---|---|
| 5,957,629 | A | 9/1999 | Hessman et al. |
| 5,988,952 | A * | 11/1999 | Antoun .................. 407/107 |
| 6,413,021 | B1 * | 7/2002 | Koch et al. ................ 407/43 |
| 6,921,233 | B2 | 7/2005 | Duerr et al. |
| 7,090,443 | B2 | 8/2006 | Hecht et al. |
| 7,597,507 | B2 | 10/2009 | Sakamoto et al. |
| 2005/0260049 | A1 | 11/2005 | Kruszynski et al. |
| 2006/0120812 | A1 | 6/2006 | Hecht et al. |
| 2008/0181737 | A1 | 7/2008 | Limell et al. |

FOREIGN PATENT DOCUMENTS

| | | | | |
|---|---|---|---|---|
| EP | 1 795 288 | A1 | 6/2007 | |
| GB | 1373084 | * | 11/1974 | ............... B23C 5/18 |
| GB | 1417434 | A | 12/1975 | |
| GB | 2157205 | A | 10/1985 | |
| JP | 56056318 | * | 5/1981 | ............... B23C 5/08 |
| JP | 07-251302 | | 10/1995 | |
| JP | 2002-144136 | | 5/2002 | |
| WO | WO 94/22622 | A1 | 10/1994 | |

OTHER PUBLICATIONS

Written Opinion in PCT/KR2008/007341, dated Jul. 27, 2009.
Office Action dated Sep. 28, 2012 issued in Chinese counterpart application (No. 200880132300.8).
Notice of Allowance dated Jul. 12, 2012 issued in Russian counterpart application (No. 2011126669/02) with translation.
Extended European Search Report dated Apr. 5, 2012 issued in European counterpart application (No. 08878769.2).
Official Action dated Dec. 7, 2012 issued in Japanese counterpart application (No. 2011-539434).

* cited by examiner

CUTTING TOOL HAVING POCKET BOTTOM WITH BASE AND INCLINED SURFACES

RELATED APPLICATIONS

This is a 35 USC 371 U.S. National Phase of International Application No. PCT/KR2008/007341, filed 11 Dec. 2008 and published in English as WO 2010/067910A1 on 17 Jun. 2010. The contents of the aforementioned application are incorporated by reference in their entirety.

TECHNICAL FIELD

The present invention generally relates to cutting tools, and more particularly to a milling cutting tool having a simple structure for performing a high-speed process to stably secure a cutting insert to a pocket part of a tool body.

BACKGROUND ART

A cutting insert mounted on a milling cutting tool for performing a high-speed process generally receives a considerable amount of cutting load during a cutting process. Accordingly, it is critical for the cutting insert used in the milling cutting tool to be reliably secured to the cutting tool body even under such a cutting load.

Generally, the cutting tool body includes a pocket part wherein the cutting insert is mounted. Said pocket part consists of a bottom surface and two planar side surfaces. The cutting insert is provided with a through-hole, through which the cutting insert is secured to the pocket part using a screw. Further, a lower surface and a side surface of said cutting insert contact a bottom surface and a side surface of the pocket part, wherein the cutting insert is pressurized and supported.

However, the bottom and side surfaces of the pocket part are not structured to provide any support to the cutting insert against the cutting load applied in the outward direction of the main body of the milling tool. This allows said cutting load to be transferred directly to the cutting insert, eventually applying an excessive force onto a screw and possibly causing damage to the screw. To lower the chances of damage, the cutting transfer speed and the cutting depth must be limited.

In order to solve such a problem, as shown in FIG. 1, there has been introduced a technique of forming projections (40) in the teeth shape on the lower surface (20) of the cutting insert (10) and grooves for receiving such projections on the bottom surface of the pocket part of the main body where the cutting insert (10) sits in. The cutting insert may be supported by the projections and the grooves, which provide the cutting insert with good resistance against the cutting load exerted in the outward direction of the main body of the tool. As such, the problem of the prior art can be resolved while ensuring a reliable fixing of the cutting insert to the main body.

However, the cutting insert should be configured such that the side and lower surfaces of the cutting insert contact the side and bottom surfaces of the pocket part of the main body. Further, it should also be configured such that the teeth-shaped projections of the cutting insert precisely fit in the grooves of the main body of the pocket part. Accordingly, the side and lower surfaces of the cutting insert and the pocket part must be produced in a precise manner. However, this inevitably increases manufacturing costs.

FIG. 2 illustrates another conventional cutting insert (50). The lower surface (55) of the cutting insert (50) is provided with concaves (60) in a V-shape. However, since it is difficult to polish the lower surface (55) due to its geometrical structure, the lower surface cannot be brought to a precise process. This causes the lower surface (55) not to precisely contact the bottom surface of the pocket part, thus failing to stably secure the cutting insert. Moreover, a super alloy cutting insert generally tends to be weak against a tensioning force but strong against a compressing force. Thus, in a structure providing concaves (60) to the lower surface (55) of the cutting insert, a predetermined opposing force to the pressuring force provided by the screw is generated at the projections (65) of the bottom surface of the pocket part, wherein said opposing force is applied to the cutting insert as the tensioning force. This can result in creating cracks around the concaves (60).

FIG. 3 illustrates yet another example of a conventional cutting insert (70). The lower surface (75) of the cutting insert (70) is provided with projections (80) on a portion of said lower surface. Further, the bottom surface of the pocket part is provided with concaves (85) receiving the projections (80). However, a gap is formed between the lower surface (90) and the bottom surface (75) of the pocket part. Accordingly, an excessive force may be applied to the screw during screw-fastening for securing the cutting insert to the bottom surface of the pocket part, which can damage the screw. In addition, from the concaves of the pocket part, the projections receive a predetermined opposing force to the cutting load, wherein said force is applied in the outward direction of the main body of the tool, thus ultimately damaging the projections.

SUMMARY

The present invention is designed to solve the above problems associated with the conventional cutting tools. It is an object of the present invention to provide a cutting tool, which is configured to be simple in structure, while being capable of reliably securing a cutting insert to the pocket part of the main body of the tool.

In order to achieve the above objective, the cutting tool of the present invention is configured to have a cutting insert and a main body, wherein said cutting insert comprises an upper surface, a lower surface and a side surface connecting the upper surface and the lower surface, and wherein said main body comprises a pocket part where the cutting insert is mounted. Said lower surface forms a downwardly convex configuration as a whole and includes: a base surface; a first inclined surface extending toward the upper surface from the inner end of the base surface and being inclined in the inward direction of the main body from the base surface when the cutting insert is mounted in the pocket part; and a second inclined surface extending toward the upper surface from the outer end of the base surface and being inclined in the outward direction of the main body from the base surface. Said pocket part includes a side surface and a bottom surface, wherein said side surface of the cutting insert contacts the side surface of the pocket part on the surface, and wherein said second inclined surface of the cutting insert contacts the bottom surface of the pocket part on the surface. Said bottom surface of the pocket part forms a concave configuration as a whole and includes: a base surface facing the base surface of the cutting insert; a first pocket part inclined surface which contacts the first inclined surface on the surface; and a second pocket part inclined surface which contacts the second inclined surface on the surface.

In the cutting tool according to the present invention, the base surface and the first inclined surface may be configured so as to be placed with a space from the bottom surface of the pocket part. The second inclined surface may be polished in order to contact the bottom surface of the pocket part on the surface.

According to the present invention, the second inclined surface, which is provided to the lower surface of the cutting insert, contacts the bottom surface of the pocket part on the surface, thereby providing a predetermined resistance against the cutting load outwardly applied from the main body. As such, the cutting insert can be reliably mounted onto the pocket part of the main body. In addition, the lower surface of the cutting insert and the bottom surface of the pocket part of the main body can be formed to have a simple configuration. Also, the number of surfaces where the cutting insert and the pocket part of the main body contact is minimized. This facilitates the manufacture of the cutting insert and the main body of the tool.

Moreover, the entire portion of the lower surface of the cutting insert is in the downwardly convex shape. This allows the cutting insert to receive a compressing force from the bottom surface of the pocket part without any tensioning force when the cutting insert is pressurized against the pocket part by a screw. Generally, a super alloy cutting insert, which is weak against the tensioning force but strong against the compressing force, is advantageous in terms of strength. Further, any damage to the cutting insert can be reduced with a predetermined opposing force to the cutting load outwardly applied to the cutting insert (the opposing force provided by the bottom surface of the pocket part) compared to the structure of convex projections provided to a portion of the planar lower surface according to the prior art.

DETAILED DESCRIPTION

The present invention will now be described with reference to the accompanying drawings.

Figure 1:
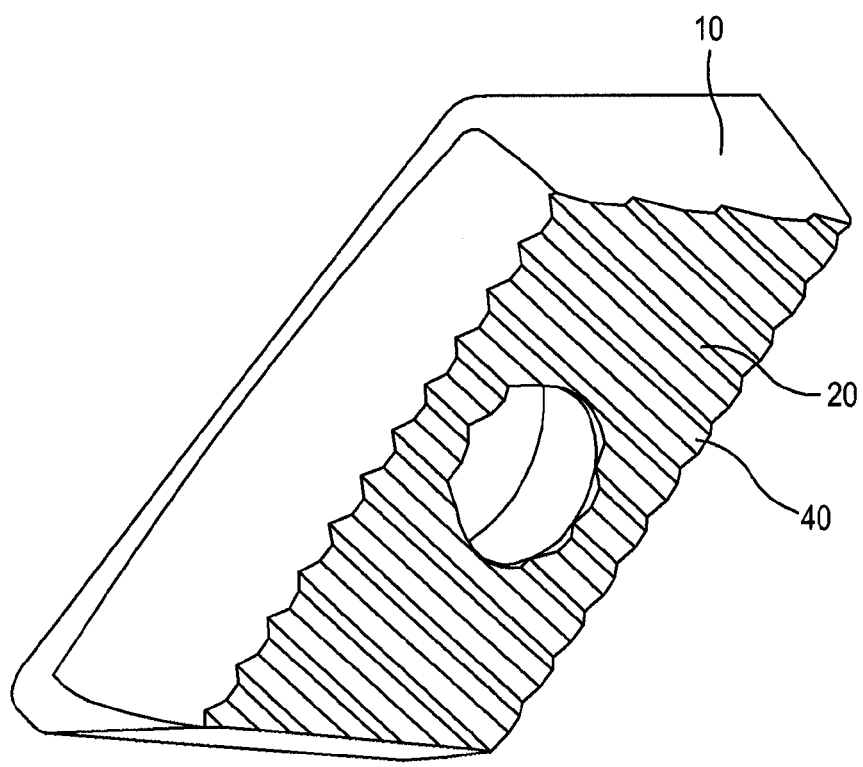
FIG. 1 is a schematic view of a cutting insert according to the prior art.
Figure 2:
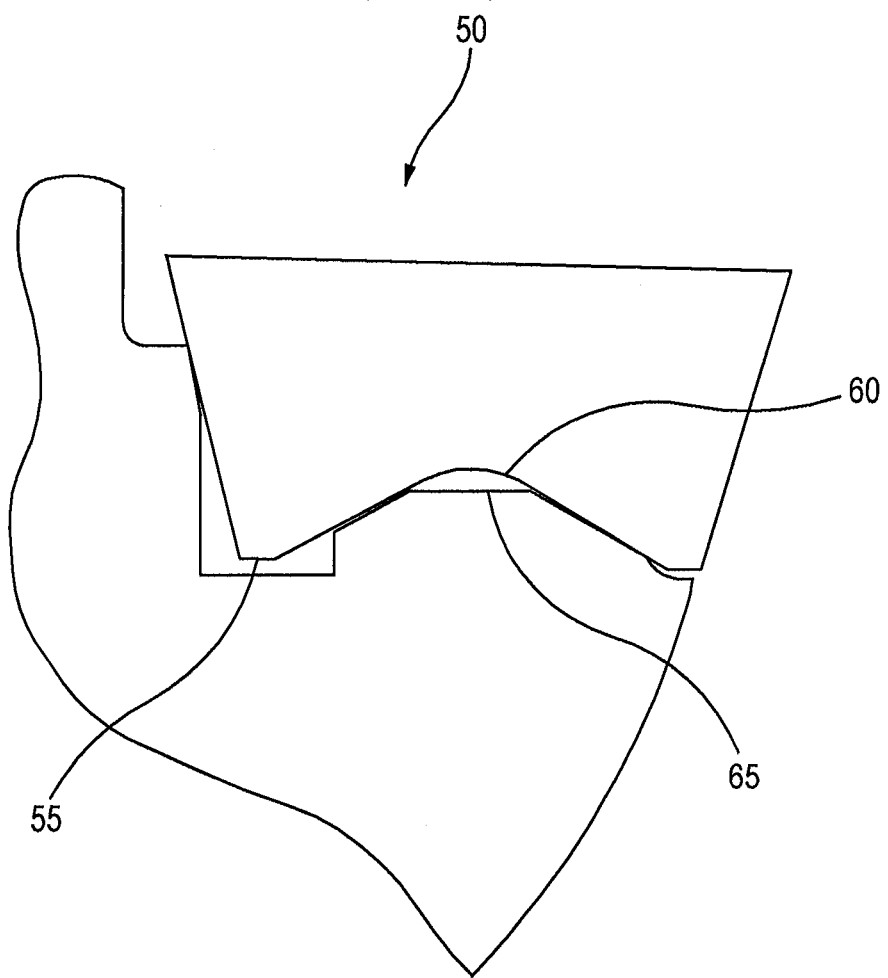
FIG. 2 is a schematic view of another cutting insert according to the prior art.
Figure 3:
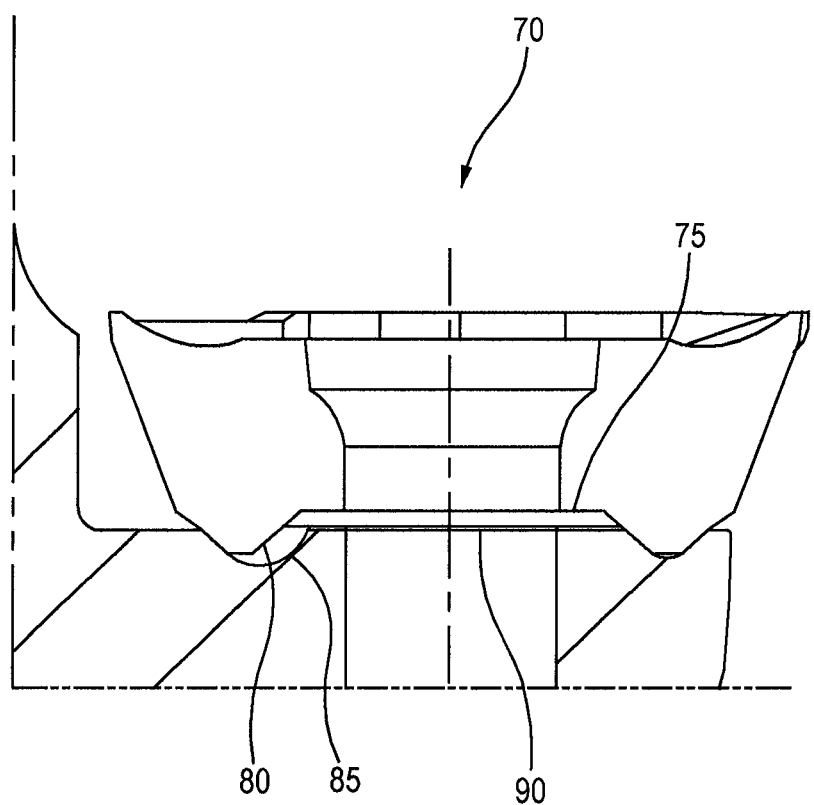
FIG. 3 is a schematic view of yet another cutting insert according to the prior art.
Figure 4:
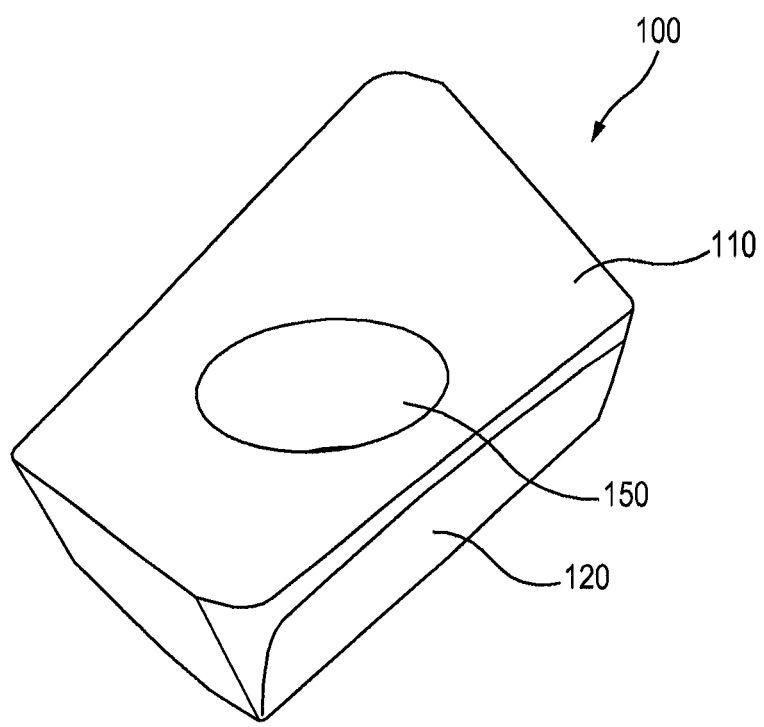
FIG. 4 is a perspective view showing an upper portion of a cutting insert according to an embodiment of the present invention.
Figure 5:
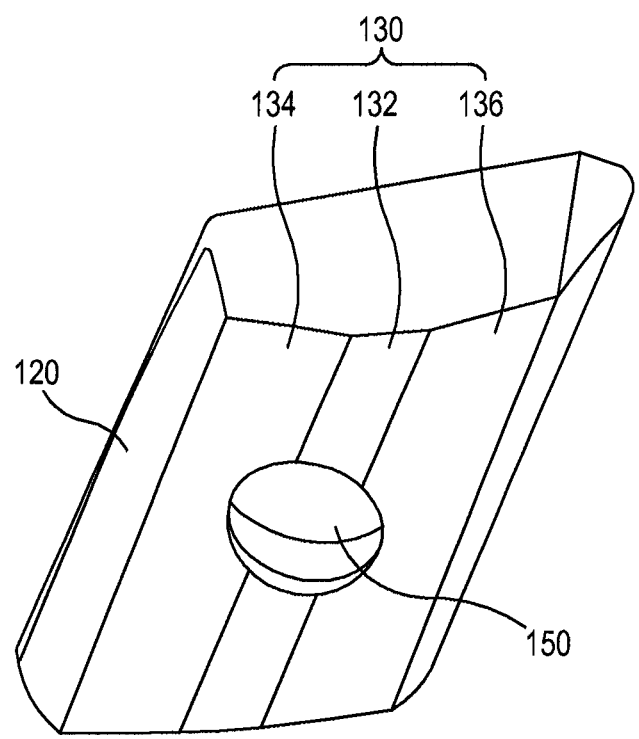
FIG. 5 is a perspective view showing a lower portion of the cutting insert according to an embodiment of the present invention.
Figure 6:
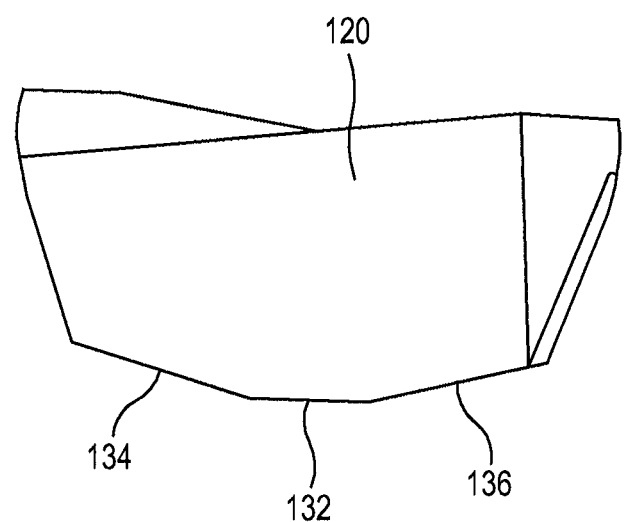
FIG. 6 is a lateral view of the cutting insert according to an embodiment of the present invention.
Figure 7:
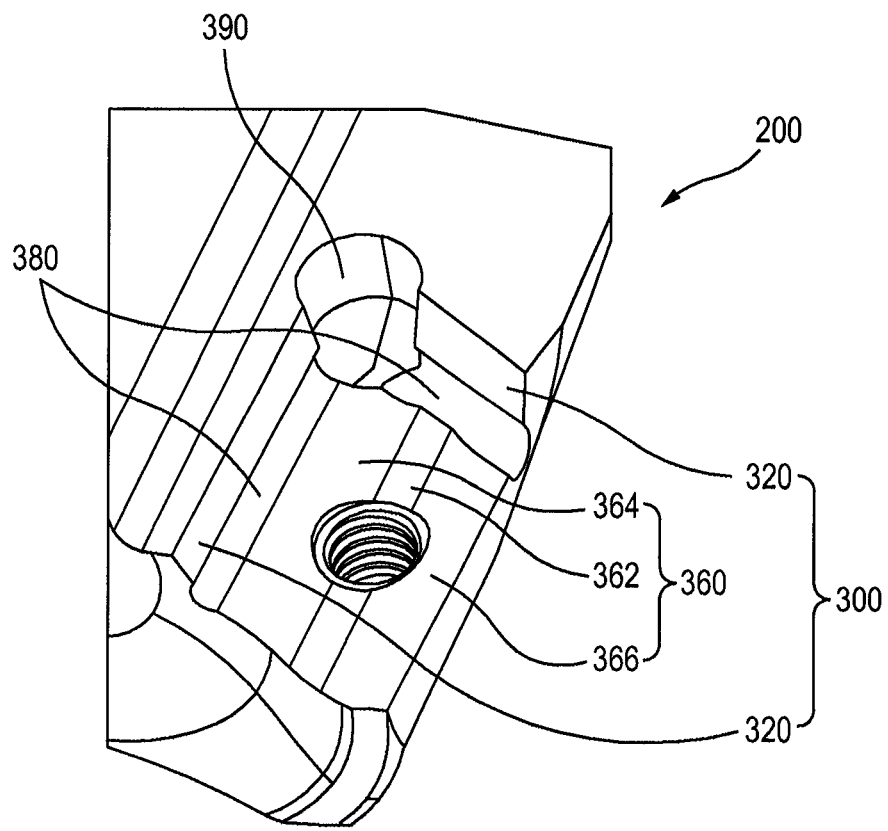
FIG. 7 is a perspective view showing a pocket part of a main body of a cutting tool according to an embodiment of the present invention.
Figure 8:
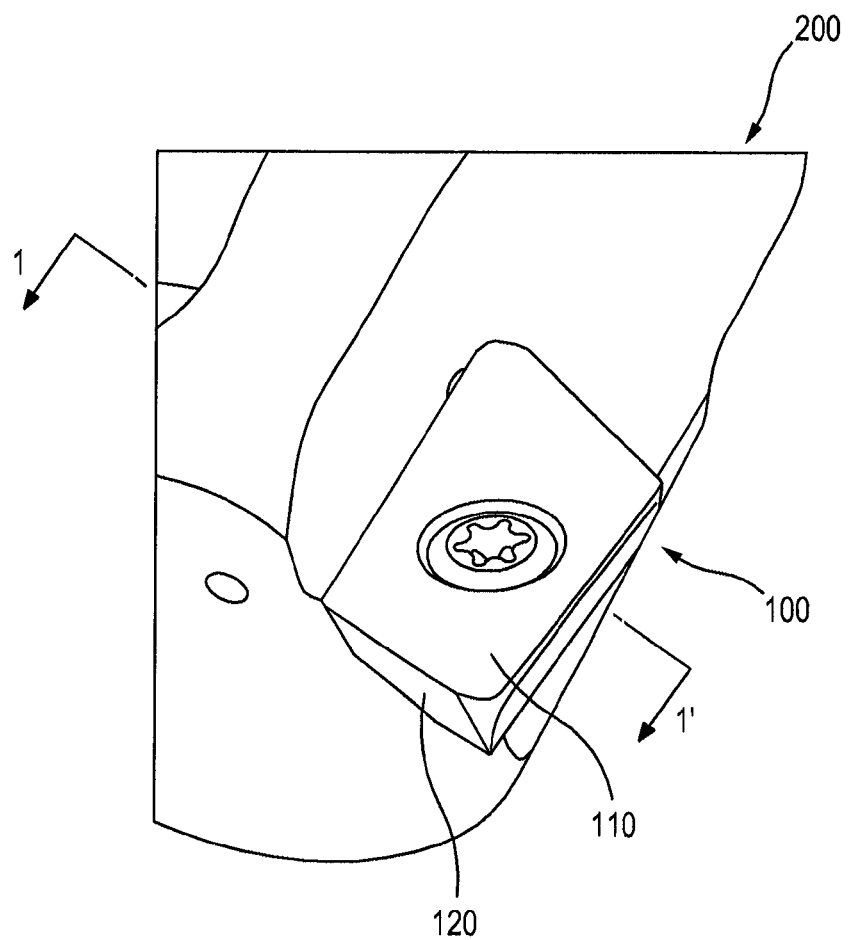
FIG. 8 is a perspective view showing a cutting tool wherein a cutting insert according to an embodiment of the present invention is mounted.
Figure 9:
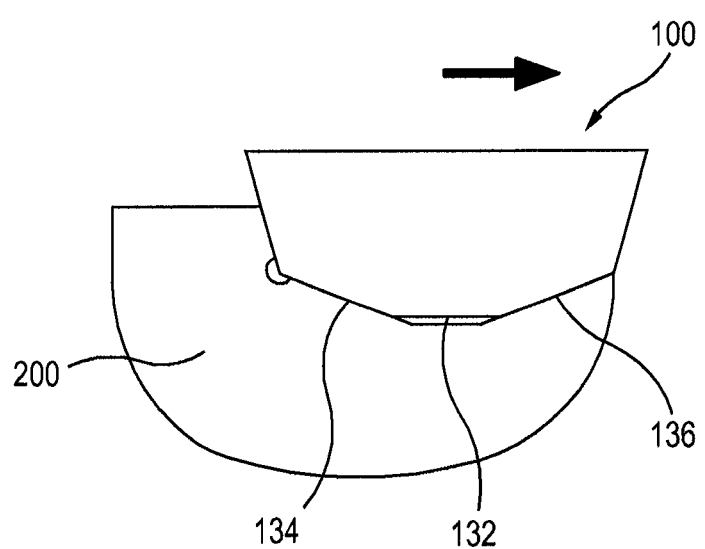
FIG. 9 is a schematic view of a side end surface of the cutting insert according to an embodiment of the present invention.

FIGS. 4 and 5 are perspective views respectively showing an upper portion and a lower portion of the cutting insert (100) according to an embodiment of the present invention. FIG. 6 is a lateral view of the cutting insert according to an embodiment of the present invention. FIG. 7 is a perspective view showing a pocket part of a main body of a cutting tool according to an embodiment of the present invention. With reference to FIGS. 4 and 5, the cutting insert (100) comprises an upper surface (110), a lower surface (130) and a side surface (120) connecting the upper surface (110) and the lower surface (130). The cutting insert (100) is provided with a through-hole (150), which passes through a center of the upper surface (110) and the lower surface (130). The cutting insert (100) is secured to a pocket part (300) of a main body (200) of a cutting tool by a screw (not shown), which is inserted through the through-hole (150). The lower surface (130) of the cutting insert (100) forms a downwardly convex configuration as a whole and includes a flat base surface (132) and end portions of the base surface (132). Both end portions consists of a first inclined surface (134) and a second inclined surface (136) extending toward the upper surface (110) from the inner end and the outer end of the base surface (132). Further, as shown in FIGS. 6 and 9, the first inclined surface (134) is inclined to the base surface (132) in the inward direction of the main body (200) when the cutting insert (100) is mounted onto the pocket part. The second inclined surface (136) is inclined to the base surface (132) in the outward direction (indicated by an arrow in FIGS. 9 and 10) of the main body when the cutting insert (100) is mounted in the pocket (300).

With reference to FIG. 7, the main body (200) of the cutting tool includes a pocket part (300) where the cutting insert (100) is mounted. The pocket part (300) includes side surfaces (320, 340) and a bottom surface (360). Corresponding to the convex configuration of the lower surface (130) of the cutting insert (100), the bottom surface (360) of the pocket part (300) includes a base surface (362), and a first pocket part inclined surface (364) and a second pocket part inclined surface (366) extending from the both ends of the base surface (362), forming a concave configuration. The first pocket part inclined surface (364), the second pocket part inclined surface (366) and base surface (362) of the pocket part (300) face the first inclined surface (134), the second inclined surface (136) and the base surface (132) of the cutting insert (100), respectively.

Preferably, inclination angles of the second inclined surface (136) of the lower surface (130) of the cutting insert (100) and the second pocket part inclined surface (366) of the pocket part to the base surface (132) are approximately between 160 and 170 degrees. If the inclination angles are greater than 170 degrees, then the second inclined surface (136) of the cutting insert (100) and the second pocket part inclined surface (366) of the pocket part are not inclined so sufficiently that the cutting insert (100) cannot be provided with a sufficient resistance against the cutting load exerted in the outward direction of the main body from the second pocket part inclined surface (366) of the pocket part (300). If the inclination angles are smaller than 160 degrees, then the main body of cutting tool can be damaged since thickness of an outer portion formed by the second pocket part inclined surface (366) of the pocket part (300) becomes smaller and strength thereof becomes weaker. Most preferably, the inclination angles of the second inclined surface (136) of the lower surface of the cutting insert (100) and the second pocket part inclined surface (366) of the pocket part to the base surface (132) must be 165 degrees.

The first inclined surface (134) and the second inclined surface (136) of the cutting insert (100) contact the first pocket part inclined surface (364) and the second pocket part inclined surface (366) of the pocket part (300) on the surfaces, respectively, and are supported thereon when the cutting insert (100) is mounted onto the pocket part (300). Thus, a predetermined opposing force (i.e. supporting force) from the second pocket part inclined surface (366) of the pocket part (300) against the cutting load applied in the outward direction from the main body (200) is applied to the cutting insert (100) and a force applied to the screw is alleviated as the opposing force. Accordingly, the likelihood of causing a damage of the screw can be alleviated while the cutting insert (100) can be reliably fastened to the pocket part (300).

Figure 10:
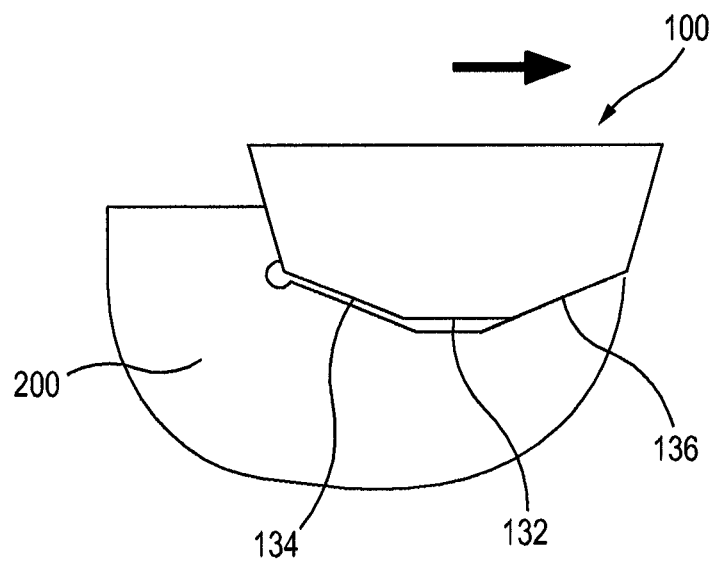
FIG. 10 is a schematic view of a side cross-section of the cutting insert according to another embodiment of the present invention.

FIG. 10 is a schematic view of a side cross-section of the cutting insert according to another embodiment of the present invention. (The through-hole (150) and the screw are omitted for convenience of the description.) With reference to FIG. 10, in this embodiment, the first inclined surface (134) and the base surface (132) of the cutting insert (100) is configured to be apart from the first pocket part inclined surface (364) and base surface (362) of the pocket part (300), respectively, when the cutting insert (100) is mounted onto the pocket part (300). Thus, a contact area of the cutting insert (100) and the pocket part (300) is minimized to the side surface and the second inclined surface. Thus, the cutting insert (100) and the pocket part (300) can be manufactured more easily since the second inclined surface (136) of the cutting insert (100) is deformed elastically when the cutting insert (100) is pressed to the pocket part (300) by the screw such that it contacts the second pocket part inclined surface (366) of the pocket part (300) on the surface.

However, it is preferable that the lower surface (130) of the cutting insert (100) is polished to improve the surface roughness thereof. Particularly, it is preferable that only the second inclined surface (136) is polished if only the second inclined surface (136) of the lower surface (130) of the cutting insert (100) contacts the bottom surface (360) of the pocket part (300). Such treatment allows entire area of the second inclined surface (136) of the cutting insert (100) to contact the pocket part (300) on the surface uniformly so that a stress concentration on a partial area of the second inclined surface (136) of the cutting insert (100) can be prevented and the likelihood of causing damage of the cutting insert (100) can be alleviated while the cutting insert (100) can be mounted onto the pocket part (300) stably.

Further, in this embodiment, the first inclined surface (134) and the second inclined surface (136) of the cutting insert (100) has a rotation-symmetry of 180 degrees with respect to the through-hole (150) passing through a center of the upper surface (110) and the lower surface (130) of the cutting insert (100). Thus, the cutting insert (100) can be relocated on the pocket part (300) by 180 degrees rotation.

Moreover, in this embodiment, chamfered recesses (380, 390) are formed at a corner portion where the side surfaces (320) of the pocket part (300) meet each other and at other corner portions where the side surfaces (320) meet the bottom surface (360). Although a protrusion according to the manufacturing problem is formed on a meeting portion of the side surfaces (120) of the cutting insert (100) or on meeting portions of the side surfaces (120) and the lower surface (130) when the cutting insert (100) is mounted onto the pocket part (300), interference of the protrusion to the side surface (320) or to the bottom surface (360) of the pocket part (300) is prevented so that the side surface (120) and the lower surface (130) of the cutting insert (100) can closely and stably contact the side surface (320) and the bottom surface (360) of the pocket part (300).

While the present invention has been described by way of embodiments thereof, the present invention may be embodied in various manners. However, these modifications will fall within the scope of the present invention.

The invention claimed is:

1. A cutting tool comprising a cutting insert and a main body,
    wherein said cutting insert includes an upper surface, a lower surface and a side surface connecting the upper surface and the lower surface, said main body including a pocket part where the cutting insert is mounted and said lower surface of the cutting insert forming a downwardly convex configuration as a whole; and
    wherein the lower surface of the cutting insert includes a base surface, a first inclined surface extending toward the upper surface from the inner end of the base surface and being inclined in the direction of the inside of the main body when the cutting insert is mounted in the pocket part, and a second inclined surface extending toward the upper surface from the outer end of the base surface and being inclined in the direction of the outside of the main body when the cutting insert is mounted in the pocket part, said pocket part including a side surface and a bottom surface and said side surface of the cutting insert contacting the side surface of the pocket part and the second inclined surface of the cutting insert contacting the bottom surface of the pocket part.

2. The cutting tool according to claim 1, wherein the bottom surface of the pocket part forms a concave configuration and includes a base surface facing the base surface of the cutting insert, a first pocket part inclined surface contacting the first inclined surface of the cutting insert and a second pocket part inclined surface contacting the second surface of the cutting insert.

3. The cutting tool according to claim 1, wherein the base surface and the first inclined surface of the cutting insert are spaced apart from the bottom surface of the pocket part.

4. The cutting tool according to claim 3, wherein the second inclined surface of the cutting insert is polished.

5. The cutting tool according to claim 1, wherein an angle between the second inclined surface of the cutting insert and the base surface of the cutting insert is approximately between 160 and 170 degrees.

6. The cutting tool according to claim 1, wherein the cutting insert includes a penetrating opening which a screw for fixing the cutting insert to the main body passes through, and wherein the lower surface of the cutting insert has a rotation-symmetry of 180 degrees around the penetrating opening.

7. The cutting tool according to claim 1, wherein a recess is formed at a corner where the side surface of the pocket part and the bottom surface of the pocket part meet.

8. A cutting tool comprising:
    a main body provided with a pocket part, the pocket part including at least one side wall and bottom surface, the bottom surface of the pocket part forming a concave configuration as whole and including a pocket part base surface, a first pocket part inclined surface connected to an inner end of the base surface and inclined towards an inside of the main body, and a second pocket part inclined surface connected to an outer end of the base surface and inclined towards an outside of the main body; and
    a cutting insert seated in the pocket part, the cutting insert including an upper surface, a lower surface and side surfaces connecting the upper surface and the lower surface, the lower surface of the cutting insert forming a downwardly convex configuration as a whole and including an insert base surface, a first inclined surface inclined upwardly from a first end of the base surface towards a first side surface, and a second inclined surface inclined upwardly from a second end of the base surface towards a second side surface, wherein:
the cutting insert is seated in the pocket part such that the second inclined surface of the cutting insert abuts the second pocket part inclined surface and the insert base surface is spaced apart from the pocket part base surface.

9. The cutting tool according to claim 8, wherein:
the first inclined surface of the cutting insert abuts the first pocket part inclined surface.

10. The cutting tool according to claim 9, wherein an angle between the second inclined surface of the cutting insert and the base surface of the cutting insert is approximately between 160 and 170 degrees.

11. The cutting tool according to claim 8, wherein:
the first inclined surface of the cutting insert is spaced apart from the first pocket part inclined surface.

12. The cutting tool according to claim 11, wherein an angle between the second inclined surface of the cutting insert and the base surface of the cutting insert is approximately between 160 and 170 degrees.

13. The cutting tool according to claim 8, wherein an angle between the second inclined surface of the cutting insert and the base surface of the cutting insert is approximately between 160 and 170 degrees.

14. The cutting tool according to claim 8, wherein the cutting insert includes a penetrating opening which a screw for fixing the cutting insert to the main body passes through, and wherein the lower surface of the cutting insert has a rotation-symmetry of 180 degrees around the penetrating opening.

15. The cutting tool according to claim 8, wherein a recess is formed at a corner where the side surface of the pocket part and the bottom surface of the pocket part meet.

16. A cutting insert, comprising:
an upper surface, a lower surface and side surfaces connecting the upper surface and the lower surface, the lower surface of the cutting insert forming a downwardly convex configuration as a whole and including an insert base surface, a first inclined surface inclined upwardly from a first end of the base surface to a first side surface, and a second inclined surface inclined upwardly from a second end of the base surface to a second side surface; and
a penetrating opening passing between the upper surface and lower surface, around which penetrating opening the cutting insert has a rotation-symmetry of 180 degrees; wherein:
an angle between the second inclined surface and the base surface is approximately between 160 and 170 degrees.

17. The cutting insert according to claim 16, wherein:
the insert base surface, the first inclined surface and the second inclined surface extend parallel to one another along a lengthwise direction of the lower surface.

* * * * *